US012580982B2

(12) United States Patent
Cheng et al.

(10) Patent No.:     US 12,580,982 B2
(45) Date of Patent:         Mar. 17, 2026

(54) AUTOMATIC SERVICE DISCOVERY AND INTER-SERVICE COMMUNICATIONS IN A PEER-TO-PEER NETWORK

(71) Applicant: Microsoft Technology Licensing, LLC, Redmond, WA (US)

(72) Inventors: Alan Cheng, Reston, VA (US); John Phillip Marquiss, Jr., Reston, VA (US); Chanwook Park, Arlington, VA (US); Thomas Neumark, Point of Rocks, MD (US); Ahmad Imad Salem, Potomac, MD (US); William Vincent Elliott, Arlington, VA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/637,916

(22) Filed: Apr. 17, 2024

(65) Prior Publication Data

US 2025/0330517 A1      Oct. 23, 2025

(51) Int. Cl.
*H04L 67/1061*      (2022.01)
*H04L 67/104*      (2022.01)
*H04L 67/145*      (2022.01)

(52) U.S. Cl.
CPC ...... *H04L 67/1063* (2013.01); *H04L 67/1044* (2013.01); *H04L 67/145* (2013.01)

(58) Field of Classification Search
CPC   H04L 67/1063; H04L 67/1044; H04L 67/145
See application file for complete search history.

(56) References Cited

U.S. PATENT DOCUMENTS

| | | | | |
|---|---|---|---|---|
| 2002/0049760 A1* | 4/2002 | Scott | ...................... | H04L 67/104 |
| 2002/0073075 A1* | 6/2002 | Dutta | .................... | G06F 16/951 |
| 2002/0116533 A1 | 8/2002 | Holliman et al. | | |
| 2004/0039781 A1* | 2/2004 | LaVallee | .............. | H04L 67/104 |
| | | | | 709/205 |
| 2005/0050028 A1* | 3/2005 | Rose | ...................... | G06Q 30/02 |
| 2005/0289589 A1* | 12/2005 | Vermola | ............ | H04N 21/4622 |
| | | | | 725/35 |

(Continued)

OTHER PUBLICATIONS

"Cassandra Documentation", Retrieved From: https://cassandra.apache.org/doc/latest/, Retrieved Date: Mar. 14, 2023, 4 Pages.

(Continued)

*Primary Examiner* — Vivek Srivastava

(57)         ABSTRACT

Systems and methods for automatic service discovery and inter-service communications in a peer-to-peer network are disclosed. A device connected to a peer-to-peer network multicasts information about services that are active on the device (e.g., local services) and accessible to other devices on the network. The device can receive, from other devices on the network, multicasted information about services that are active on the other devices (e.g., remote services). The device includes a registry for maintaining information about available local and remote services. Each device in the network can send queries to active services on other devices on the network and receive notifications from those remote services when the remote services identify relevant data (e.g., data that satisfies the query).

20 Claims, 9 Drawing Sheets

(56) References Cited

U.S. PATENT DOCUMENTS

| | | | |
|---|---|---|---|
| 2009/0164583 A1* | 6/2009 | Zhu | H04L 67/1063 709/205 |
| 2009/0172180 A1* | 7/2009 | Chiu | H04L 67/1048 709/231 |
| 2010/0023974 A1* | 1/2010 | Shiragaki | H04N 21/4331 725/58 |
| 2010/0081432 A1* | 4/2010 | Alam | H04W 4/00 455/456.2 |
| 2011/0072075 A1* | 3/2011 | Gautier | H04L 12/1881 709/203 |
| 2011/0087775 A1* | 4/2011 | Lee | H04L 67/104 709/227 |
| 2013/0159537 A1* | 6/2013 | Kwon | H04L 67/51 709/227 |
| 2014/0258395 A1 | 9/2014 | Tng | |

OTHER PUBLICATIONS

"Documentation", Retrieved From: https://redis.io/docs/, Retrieved Date: Mar. 14, 2023, 2 Pages.
Extended European search report received for European Application No. 25168390.0, mailed on Jun. 12, 2025, 12 pages.

* cited by examiner

| Local Services 201 | | | | |
| Service Name | IP Address | Port | Last Alive | Status |
| None | | | | |

| Remote Services 211 | | | | |
| Service Name | IP Address | Port | Last Alive | Status |
| Service 1 | 1.1.1.1.1 | 2 | 11/11/23 12:03 | Active |

212　　214　　216　　218　　220

200

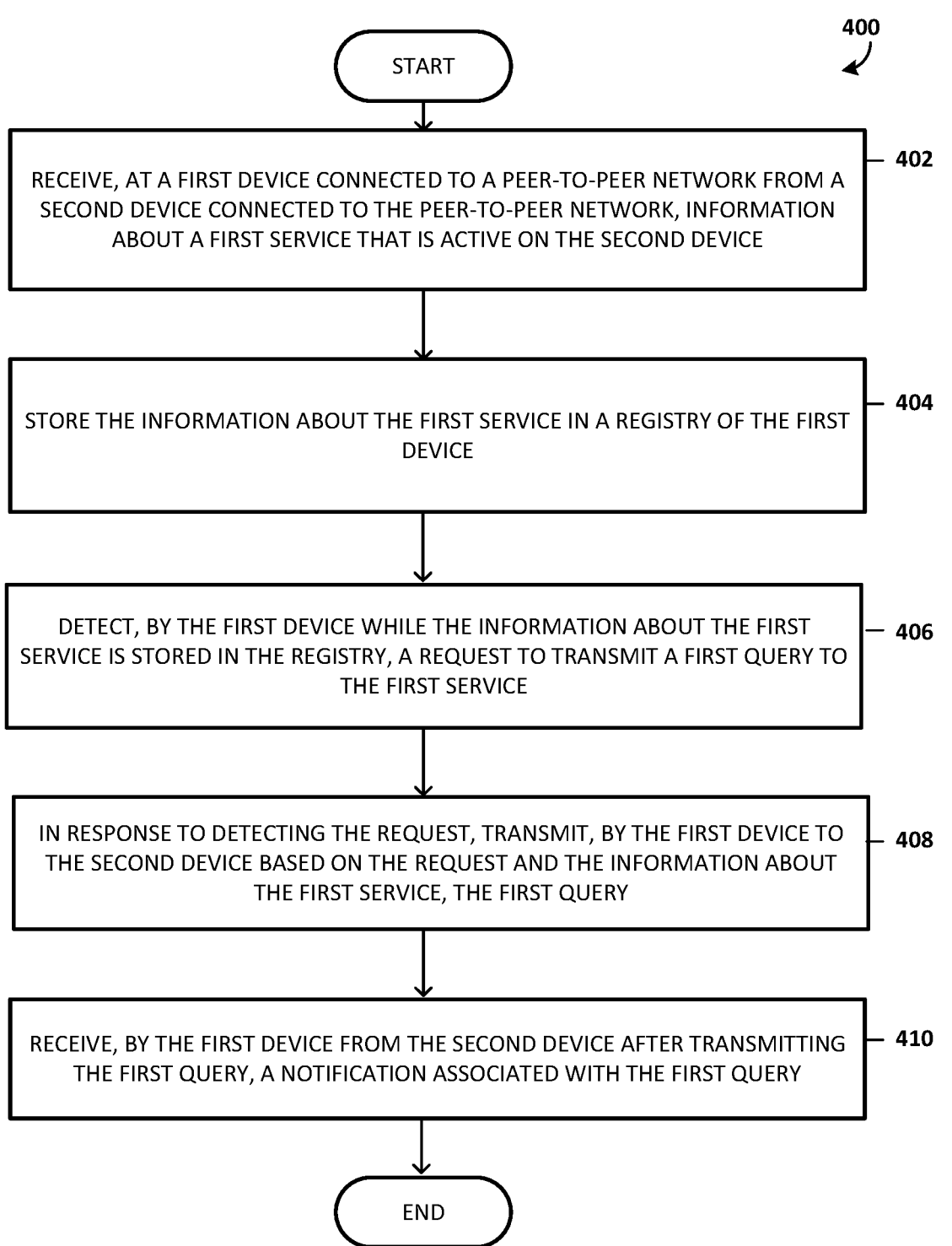

400

START

402 — RECEIVE, AT A FIRST DEVICE CONNECTED TO A PEER-TO-PEER NETWORK FROM A SECOND DEVICE CONNECTED TO THE PEER-TO-PEER NETWORK, INFORMATION ABOUT A FIRST SERVICE THAT IS ACTIVE ON THE SECOND DEVICE

404 — STORE THE INFORMATION ABOUT THE FIRST SERVICE IN A REGISTRY OF THE FIRST DEVICE

406 — DETECT, BY THE FIRST DEVICE WHILE THE INFORMATION ABOUT THE FIRST SERVICE IS STORED IN THE REGISTRY, A REQUEST TO TRANSMIT A FIRST QUERY TO THE FIRST SERVICE

408 — IN RESPONSE TO DETECTING THE REQUEST, TRANSMIT, BY THE FIRST DEVICE TO THE SECOND DEVICE BASED ON THE REQUEST AND THE INFORMATION ABOUT THE FIRST SERVICE, THE FIRST QUERY

410 — RECEIVE, BY THE FIRST DEVICE FROM THE SECOND DEVICE AFTER TRANSMITTING THE FIRST QUERY, A NOTIFICATION ASSOCIATED WITH THE FIRST QUERY

END

FIG. 4

AUTOMATIC SERVICE DISCOVERY AND INTER-SERVICE COMMUNICATIONS IN A PEER-TO-PEER NETWORK

BACKGROUND

Computing-based services, such as document search services or other types of services, are often implemented using a client-server architecture in which multiple client devices connect to a centralized remote server that manages the service. Such architectures require the server to be available in order to provide the service and may be less efficient in highly dynamic environments in which devices are frequently joining and leaving the network.

It is with respect to these and other considerations that examples are presented herein. In addition, although relatively specific problems have been discussed, it should be understood that the examples should not be limited to solving the specific problems identified in the background.

SUMMARY

Examples described in this disclosure relate to systems and methods for automatic service discovery and inter-service communications in a peer-to-peer network. In some examples, a device connected to a peer-to-peer network multicasts (e.g., transmits, broadcasts), to the network, information about services that are active on the device (e.g., local services) and accessible to other devices on the network. The device can receive, from other devices on the network, multicasted information about services that are active on the other devices (e.g., remote services). The device includes a registry (e.g., a file) for maintaining information about available local and remote services. Each device in the network can send queries to active services on other devices on the network and receive notifications from those remote services when the remote services identify relevant data (e.g., data that satisfies the query).

In some examples, one or more devices on the network provide user interfaces for displaying a state of the network (e.g., indicating local and remote devices that are connected to the network and services that are active on the devices), for receiving user inputs specifying queries to be sent to local or remote services, and for displaying notifications received in response to the queries.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The present disclosure is illustrated by way of examples in the accompanying figures, in which like references indicate similar elements. Elements in the figures are illustrated for simplicity and clarity and have not necessarily been drawn to scale.

FIG. 4 is a flowchart depicting an example method for automatic service discovery and inter-service communications in a peer-to-peer network in accordance with some examples.

DETAILED DESCRIPTION

Figure 1A:
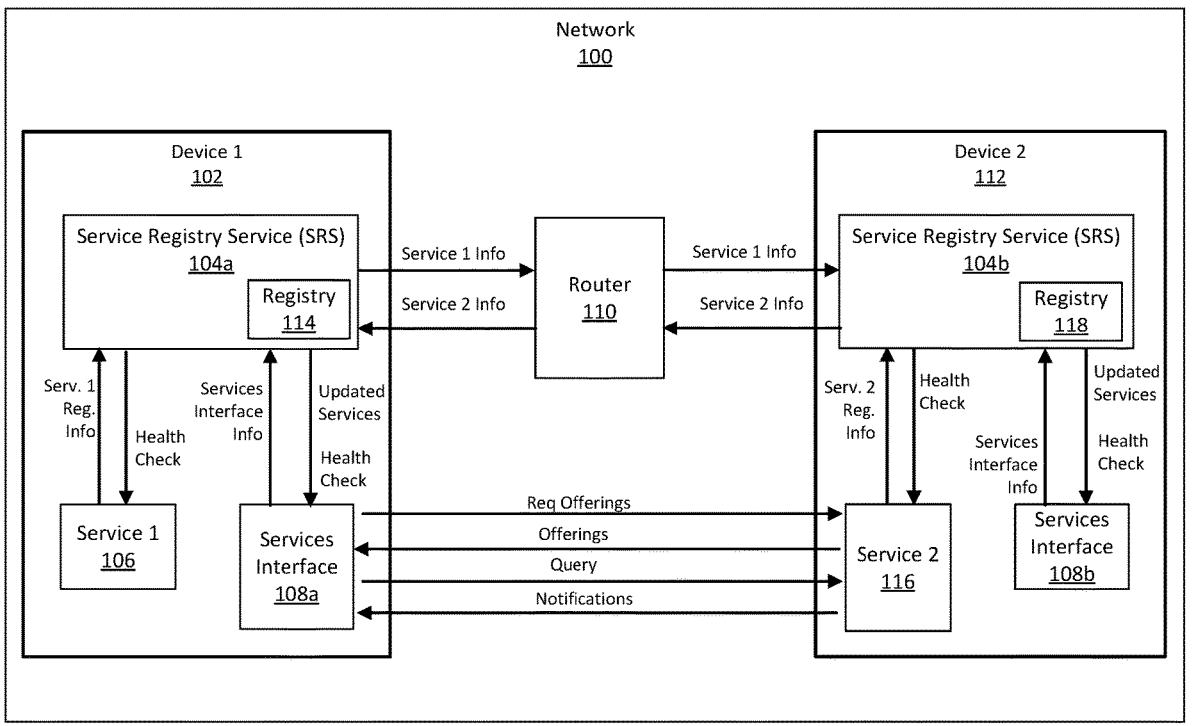
FIG. 1A is a block diagram of a system for automatic service discovery and inter-service communications in a peer-to-peer network in accordance with some examples.

Examples described in this disclosure relate to systems and methods for automatic service discovery and inter-service communications in a peer-to-peer network. Computing-based services are often implemented using a client-server architecture in which multiple client devices connect to a centralized server that manages the service and accesses a corpus of data. Such an architecture typically requires access to the Internet and availability of the centralized server to support the service. In some cases, however, it may be desirable to enable devices to share data and/or services with each other via a peer-to-peer network (e.g., a decentralized local area network in which devices can communicate directly with each other). As disclosed herein, devices on a network may be configured to discover and query remote services that are active on other devices in the peer-to-peer network without the use of a centralized server or Internet connection.

For example, a first device that is running a local video analytics service (e.g., executing a video analytics application that is installed on the first device and monitoring an input video stream received at the first device) can receive a query from a second device on the network requesting that the video analytics application monitor an input video stream for instances of an event or item of interest. In response to receiving the query, the first device sends a notification to the second device each time the video analytics service identifies a match in the input video stream, thereby essentially providing a remote video analytics service to the second device via the peer-to-peer network.

To enable devices on the peer-to-peer network to discover which services are available on other devices on the network, each device listens for multicasted information from other devices about services that are available (e.g., active) on the other devices and periodically multicasts information about its own active services (if any). Such information can include, for example, a description of the type of service (e.g., video analytics, document search, knowledge mining, or another type of service), an IP address of the service, a status of the service, and/or other information about the service that may be needed, by another device on the network, to query that service. Each device maintains a registry of information about available local and remote services and updates the registry based on multicasts received from other devices.

As an example of the above-described functionality, a first device periodically multicasts, to the peer-to-peer network, information about an active service running on the first device, thereby alerting other devices on the network of the availability of the service. Other devices on the network, including a second device, each receive the information about the service and store the information in their respective local registry. The second device can access the (remote) service that is active on the first device by transmitting a query to the first device. The query may be generated by the second device based on, for example, an input from a user of the second device, such as a search string. In some examples, the second device formats the query based on the information about the service that is stored in the registry of the second device.

The first device (e.g., the service of the first device to which the query is directed) receives the query and, in some examples, stores the query locally such that it is persistent at the first device and accessible to the service on the first device. The service then checks and/or monitors a data source associated with the service (e.g., a video stream, a set of documents, or another type of data source) to identify data that satisfies the query, and notifies the second device when such data is identified (e.g., by transmitting a notification to the second device that includes a link to the identified data or includes the identified data itself).

In some examples, systems and methods for automatic service discovery and inter-service communications in a peer-to-peer network include user interfaces that enable a user or service of a device to access services of another device. In some examples, the user interfaces display a status of the network (e.g., which devices are on the network and which services are available on the devices). In some examples, the user interfaces enable a user of a device to select a remote service that is available on another device and input a search string to cause the user's device to generate a query that is sent to the service of the other device. In some examples, the user interface displays notifications received from the service (e.g., from the other device) in response to the query.

The systems and methods described herein provide decentralized sharing of services and data across devices in a network without necessarily requiring the use of a centralized server or an Internet connection. Such an approach may be beneficial in highly dynamic network environments in which devices frequently join and leave the network and/or in environments in which an Internet connection is unavailable or undesirable. Moreover, because each device may have access to its own data sources (e.g., video streams from local cameras of the device, local databases stored on the device, and/or local documents accessible to the device), a device on the network can issue a query to remote services running on multiple remote devices to search or monitor multiple disparate data sources (e.g., rather than searching a single corpus of data, as is more typically done in a client-server architecture).

Additional details regarding systems for automatic service discovery and inter-service communications in a peer-to-peer network are discussed with reference to FIGS. 1A-5.

FIG. 1A is a block diagram of an example network 100 for automatic service discovery and inter-service communications in a peer-to-peer network in accordance with one example. The network 100 is a peer-to-peer network that includes a first device 102 that is communicatively coupled with a second device 112 in the network 100 (e.g., using a router 110). In examples, the network 100 can include additional devices that are communicatively coupled with the first device 102 and second device 112 and operate as described below with respect to the first device 102 and second device 112.

The first device 102 and second device 112 can be or can include any type of mobile or stationary computing device (such as computing device 500 of FIG. 5) that is capable of executing a service (e.g., running an application or other software installed on the computing device) and connecting to the network 100. For example, the first device 102 and/or second device 112 may be laptop computers, cellular phones, or other types of computing devices. The network 100 can be a wired or wireless local area network (LAN) that enables computing devices that are connected to the network 100 (e.g., the first device 102 and second device 112) to communicate with each other directly, without the use of an external server and/or without access to the Internet or the cloud.

In the example of FIG. 1A, the network 100 includes a router 110 that routes communications between devices in the network 100. In other examples, the network does not include a router 110. For example, the network may be a token ring network or a bus network, or may be a mobile ad-hoc network (MANET) in which devices act as routers themselves (e.g., the network does not include a separate router).

As shown in FIG. 1A, the first device 102 and second device 112 each include an instance of a service registry service (SRS) (e.g., first SRS 104a and second SRS 104b) and an instance of a services interface (e.g., first services interface 108a and second services interface 108b). In some examples, the SRSs 104 and services interfaces 108 are applications (e.g., software instances) that are installed and executed on the first device 102 and the second device 112 and operate as described herein to support automatic service discovery and inter-service communications in a peer-to-peer network.

Conceptually, each of the SRSs 104 is configured to multicast, to the network 100, information about services that are active on the SRS's own device (i.e., local services of the device on which the SRS 104 is installed) and maintain a registry of information about remote services that are active on other devices in the network 100. The service interfaces 108 are configured to communicate with services of other devices, such as by sending queries and receiving notifications, and/or by requesting and receiving information about offerings of remote services (e.g., subcategories of the service that can be individually queried, such as specific data sources).

In the example of FIG. 1A, the first SRS 104a of the first device 102 is communicatively coupled with the first service 106 and with the first services interface 108a. In some examples, the first service 106 provides registration information associated with the first service 106 to the first SRS 104a and the first SRS 104a stores the registration information in a registry 114. The registration information associated with the first service may include, for example, a service type, a service name, a namespace and/or pod (e.g., a set of one or more containers running instances of an application), a service public IP address, a service port, a service location, and/or a service description.

In some examples, the first service 106 provides the registration information to the first SRS 104a each time the first service 106 becomes active on the first device 102 (e.g., when the service transitions from an inactive state to an active state, such as the service is launched and/or begins to access data).

Similarly, the first services interface 108*a* also provides registration information associated with the first services interface 108*a* to the first SRS 104*a*, and the first SRS 104*a* stores the registration information associated with the first services interface 108*a* in the registry 114. The registration information may include, for example, metadata about the first services interface 108*a*, such as the functions and capabilities of services provided by the first services interface 108*a*.

In some examples, the first SRS 104*a* is configured to detect when the first service 106 has become active and/or has become inactive. For example, the first SRS 104*a* may detect that the first service 106 has become active based on receiving, from the first service 106, the registration information and/or an indication that the first service 106 is active, and/or by periodically pinging the first service 106 and determining the status of the first service 106 based on the first service's response to the ping (or lack of response). For example, the first SRS 104*a* may run a health check on the first service 106 to determine whether the first service 106 is active and available to interact with.

In some examples, in response to detecting that the first service 106 has become active (e.g., has transitioned from an inactive state to an active state), the first SRS 104*a* begins periodically multicasting information about the first service 106 to the network 100. In some examples, the first SRS 104*a* continues to periodically multicast information about the first service 106 while the first service 106 remains active. In some examples, the information about the first service 106 includes information that can be used, by another device on the network 100 (e.g., the second device 112), to identify the type of the first service 106 and access the first service 106 by sending queries to the first service 106. In some examples, the information about the first service 106 includes some or all of the registration information provided by the first service 106 and stored in the registry 114, and/or a last-alive time of the first service 106 (e.g., a time at which the first service 106 was most recently active), a status of the first service 106 (e.g., active or inactive, which may be determined by the first device based on the last-alive time), an identifier of the first service 106 (e.g., a randomly generated identifier or another type of identifier) that can be used to differentiate between instances of the first service 106, or a combination of these.

In some examples, the first SRS 104*a* multicasts a first set of information about the first service 106 in response to detecting that the first service 106 has transitioned from an inactive state to an active state, and subsequently periodically multicasts a second set of information about the first service 106 while the first service 106 remains active. For example, the second set of information may be a subset of the first set of information that includes an indication that the first service is active (e.g., by indicating a last-alive time of the first service 106 and/or status associated with the first service 106) to provide updated status information about the first service 106 without necessarily including all of the registration information associated with the first service 106).

In some examples, the first SRS 104*a* periodically transmits the information about the first service 106 at fixed intervals (e.g., every 1, 3, 5, 10, 20, or 30 seconds). In some examples, the fixed intervals are randomly selected (e.g., by the first SRS 104*a*) to avoid traffic spikes on the network 100 (e.g., so that instances of SRSs on different devices do not inadvertently synchronize multicasts). In some examples, the first SRS 104*a* periodically transmits the information about the first service at increasing time intervals rather than at fixed time intervals, until the time interval reaches a predetermined maximum time interval. For example, the first SRS 104*a* may initially multicast the information about the first service 106 every 2 seconds, increasing to every 5 seconds after a first threshold time duration has elapsed since the first service became active, and further increasing to a maximum of every 30 or 60 seconds after a second threshold time duration has elapsed.

In some examples, the second SRS 104*b* is configured to operate with regards to the second service 116 in a manner similar to that described above with reference to the first SRS 104*a* and the first service 106, such as by receiving registration information from the second service 116 and storing the registration information in the registry 118, detecting a status of the second service 116, and periodically multicasting information about the second service 116 to the network 100 while the second service 116 remains active.

In the example of FIG. 1A, in response to detecting that the first service 106 is active, the first SRS 104*a* multicasts information about the first service 106 to the network 100. Similarly, in response to detecting that the second service 116 is active, the second SRS 104*b* multicasts information about the second service 116 to the network 100. In some examples, if additional services were active on the first device 102 and/or second device 112, the respective SRSs of the first device 102 and/or second device 112 would multicast information about the additional services that are active on the respective device, either by including the information about the additional services in the multicast with information about the first service 106 or second service 116 (e.g., each multicast from a device includes information about all active services on the device), or as a separate multicast (e.g., each active service of a device has a separate multicast).

The first SRS 104*a* receives, via the network 100, the multicasted information about the second service 116 and stores the information about the second service 116 in the registry 114 of the first SRS 104*a*. Similarly, the second SRS 104*b* receives, via the network 100, multicasted information about the first service 106 and stores the information about the first service 106 in the registry 118 of the second SRS 104*b*.

In some examples, the first SRS 104*a* provides the information about the second service 116 to the first services interface 108*a* to enable the first services interface 108*a* to display user interfaces such as described with reference to FIGS. 2A-3C, and/or to communicate with the second service 116 (e.g., to request and receive information about available offerings associated with the second service 116, to transmit queries to the second service, and to receive notifications from the second service in response to queries). In some examples, the first services interface 108*a* periodically requests, from the first SRS 104*a*, updated information about remote devices and/or remote services that are active on the remote devices, and receives updated information (e.g., current information about the service stored in the registry) in response to the request.

In some examples, in response to receiving information about a new remote service (e.g., a service that has become active on a remote device on the network 100), the first services interface 108*a* requests, from the new service, information about offerings of the new service. For example, in response to receiving information about the second service 116 when the second service 116 becomes active, the first services interface 108a may transmit, to the second service 116 via the network 100, a request for offerings information associated with the second service 116 and receive, from the second service 116 via the network 100, information about one or more offerings of the second service 116 (if the second service 116 includes specific offerings). As an example, if the second service 116 is a video analytics service that receives and analyzes video data from two different camera sources, each of the cameras may be considered as an offering that can be separately queried to monitor for a specified item or event.

The information about the offering(s) may include an endpoint(s) of the offering(s) of the second service 116 to enable the first services interface 108a to direct queries to a particular offering of the second service 116 (e.g., by including an indication of the specific offering in the query). The first services interface 108a may generate a query associated with the second service 116 (e.g., in response to detecting one or more user inputs via a user interface of the first services interface 108a, such as depicted in FIG. 3B) and transmit the query to the second service 116 based on the information about the second service 116 (e.g., based on the IP address, the port, or other information about the second service 116) and, where relevant, based on information about the offering (e.g., an endpoint of the offering).

In some examples, the query includes a search string (e.g., a text string that is inputted by a user via a user interface of the first services interface 108a), a callback uniform resource locator (URL) indicating an endpoint of the first services interface 108a (e.g., a destination) to which the second service 116 should send notifications in response to the query, and/or a URL or other information that specifies an offering endpoint of the second service 116 (e.g., if a specific offering of the second service 116 is being queried).

As depicted in FIG. 1A, the second service 116 receives the query from the first services interface 108a and in some examples, saves the query locally as a persistent query. In response to receiving the query, the second service 116 checks and/or monitors one or more data sources to identify data that satisfies the query. For example, the second service 116 may search and/or monitor a database and/or documents on the second device (or otherwise accessible to the second device) to identify text that matches the search string. As another example, second service 116 may search and/or monitor a video stream to determine when an item or event that is detected in the video stream satisfies (e.g., matches or corresponds to) the search string. In some examples, the second service 116 continues to monitor data received by the second service 116 (e.g., a video stream or other type of data) to identify items that satisfy the query until the second service 116 receives, from the first services interface 108a, a request to delete the query.

In some examples, in response to identifying data that satisfies the query, the second service 116 saves the relevant data (e.g., the document or portion of a video stream that satisfies the query) for subsequent access (e.g., by the first device 102), and transmits a notification to the first services interface 108a (e.g., via the callback URL provided in the query). The notification may include, for example, the name of the second service 116, the offering that generated the notification (if any), the IP address and/or port of the second service 116, the search string (e.g., the string that was specified (e.g., included) in the query and used to identify the data), a timestamp of the notification (e.g., a time at which the data was identified and/or the notification was generated), and/or a viewing URL that provides a link to view the data that satisfied the query.

Figure 3A:
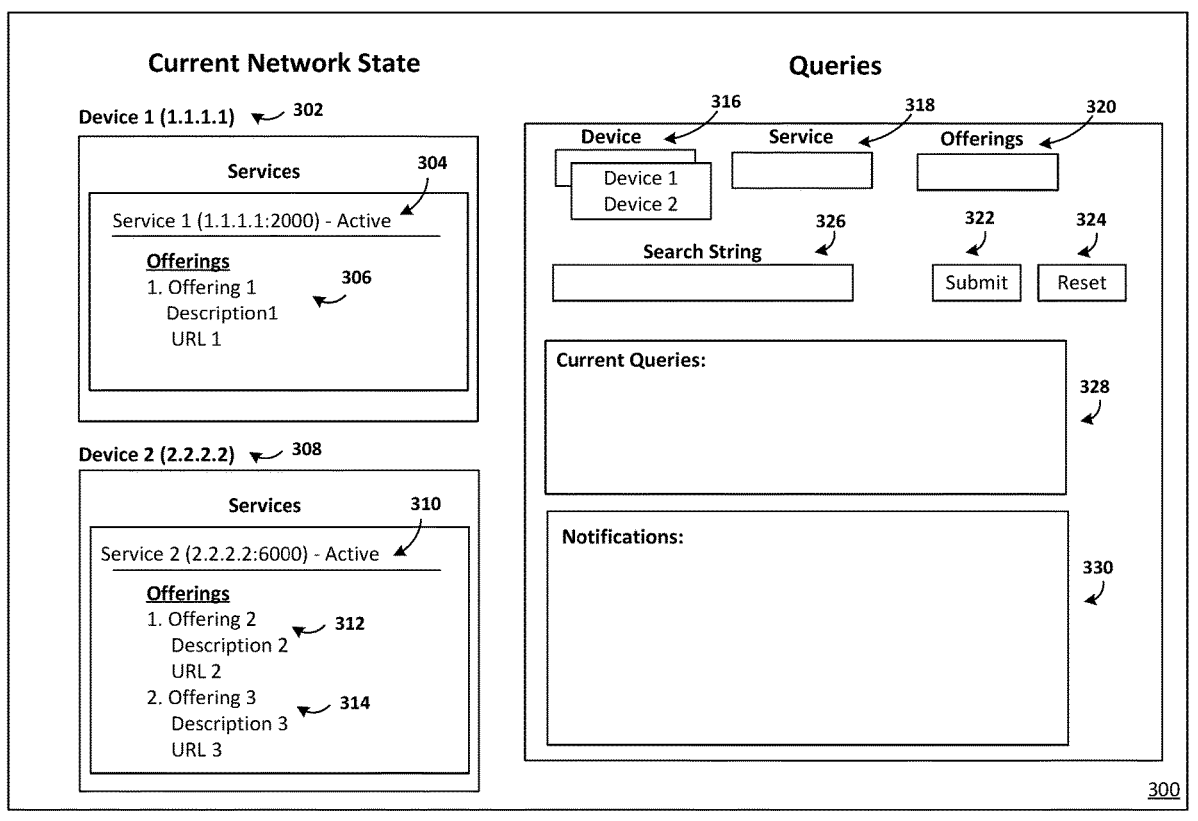
FIG. 3A is an example of a user interface for automatic service discovery and inter-service communications in a peer-to-peer network in accordance with some examples.
Figure 3B:
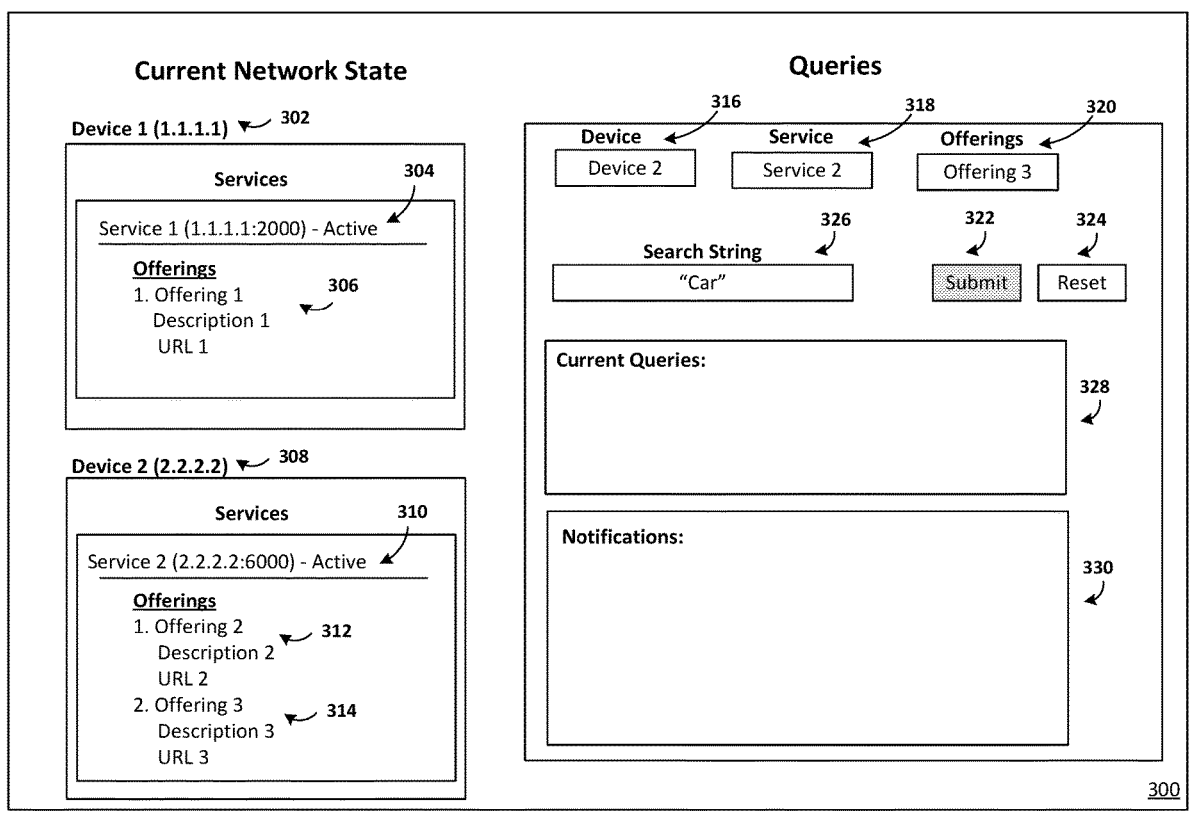
FIG. 3B is an example of a user interface for automatic service discovery and inter-service communications in a peer-to-peer network in accordance with some examples.
Figure 3C:
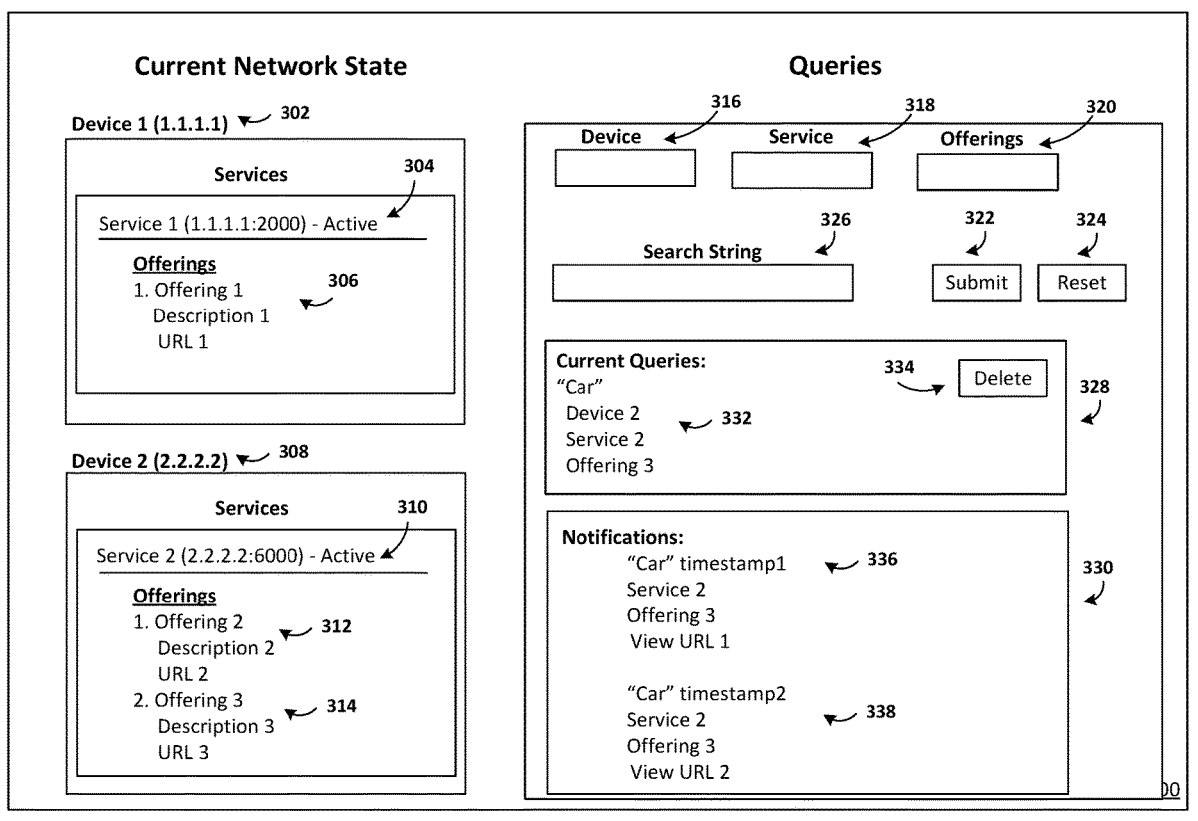
FIG. 3C is an example of a user interface for automatic service discovery and inter-service communications in a peer-to-peer network in accordance with some examples.

The first services interface 108a may receive the notification(s) from the second service 116 in response to the query and may display the notification(s) via a user interface of the first services interface 108a, such as depicted in FIG. 3C.

Figure 1B:
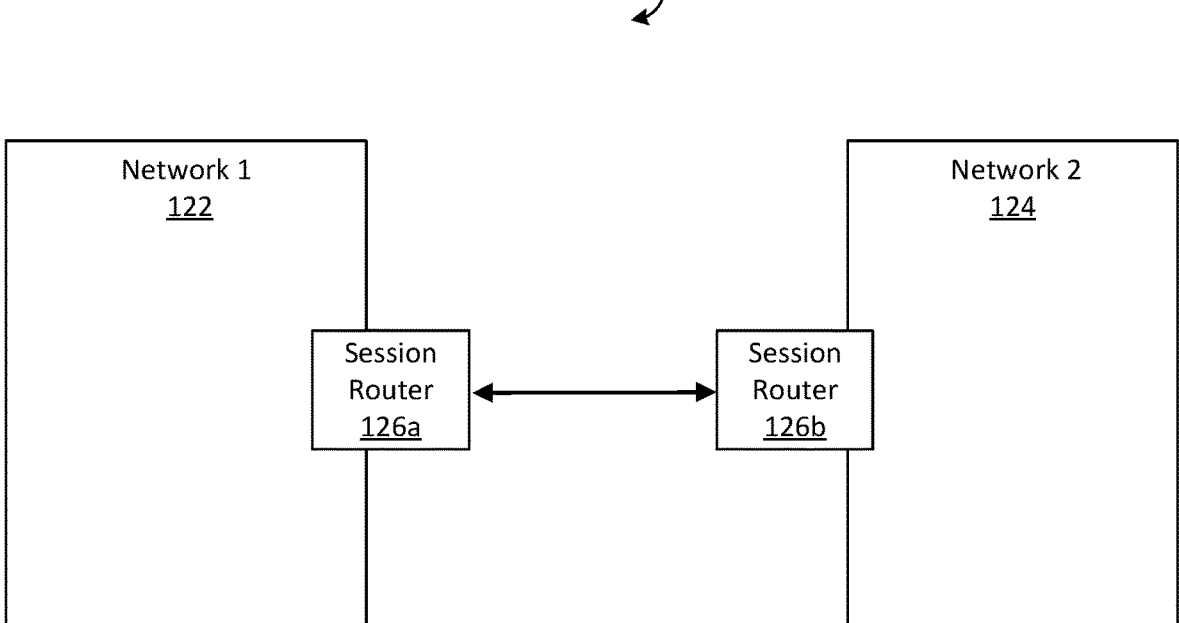
FIG. 1B is a block diagram of a system for automatic service discovery and inter-service communications in a peer-to-peer network in accordance with some examples.

FIG. 1B is a block diagram of another example network 120 for automatic service discovery and inter-service communications in a peer-to-peer network in accordance with one example. Network 120 includes a first network 122 and second network 124, each of which may be similar to network 100 described with reference to FIG. 1A. For example, first network 122 and second network 124 may each be peer-to-peer networks that include multiple devices connected to the respective network. Alternatively, one or more of first network 122 and second network 124 may each be different type of network that enables devices to create peer-to-peer connections, such as a LAN, a private area network (PAN), or a wide area network (WAN). The first network 122 and second network 124 are configured to communicate with each other via a first session router 126a communicatively coupled with the first network 122 and a second session router 126b communicatively coupled with the second network 124 and with the first session router 126a. The session routers 126a,b enable devices in the first network 122 to communicate with devices in the second network 124 and share services and data in a manner similar to that described with reference to FIG. 1A. For example, devices in the first network 122 may multicast information about active services on the devices in the first network 122 and such information may be provided to devices in the second network 124 via the first session router 126a and second session router 126b. Similarly, devices in the second network 124 may multicast information about active services on the devices in the second network 124 and such information may be provided to devices in the first network 122 via the first session router 126a and second session router 126b. Other communications between devices in the first network 122 and second network 124 operate in a manner similar to that described with reference to FIG. 1A, with the addition of communications between the session routers 126a,b that enable cross-network communication.

Figure 2A:
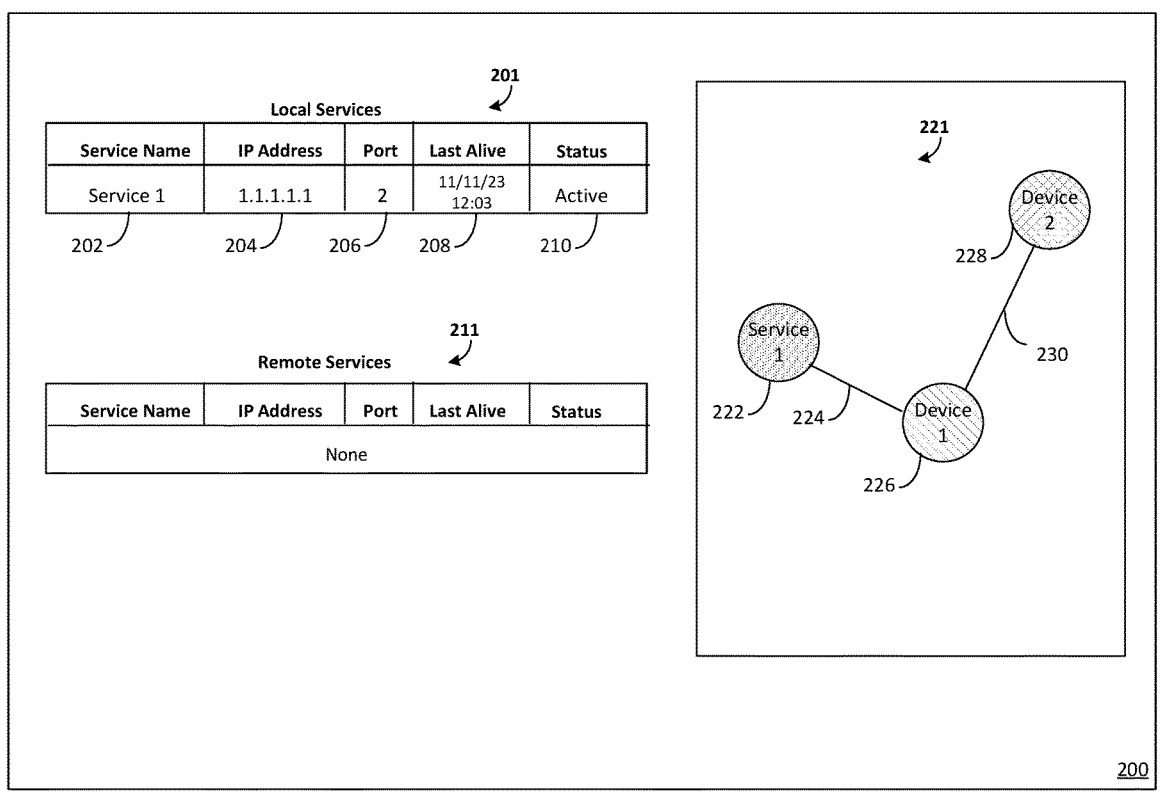
FIG. 2A is an example of a user interface for automatic service discovery and inter-service communications in a peer-to-peer network in accordance with some examples.
Figure 2B:
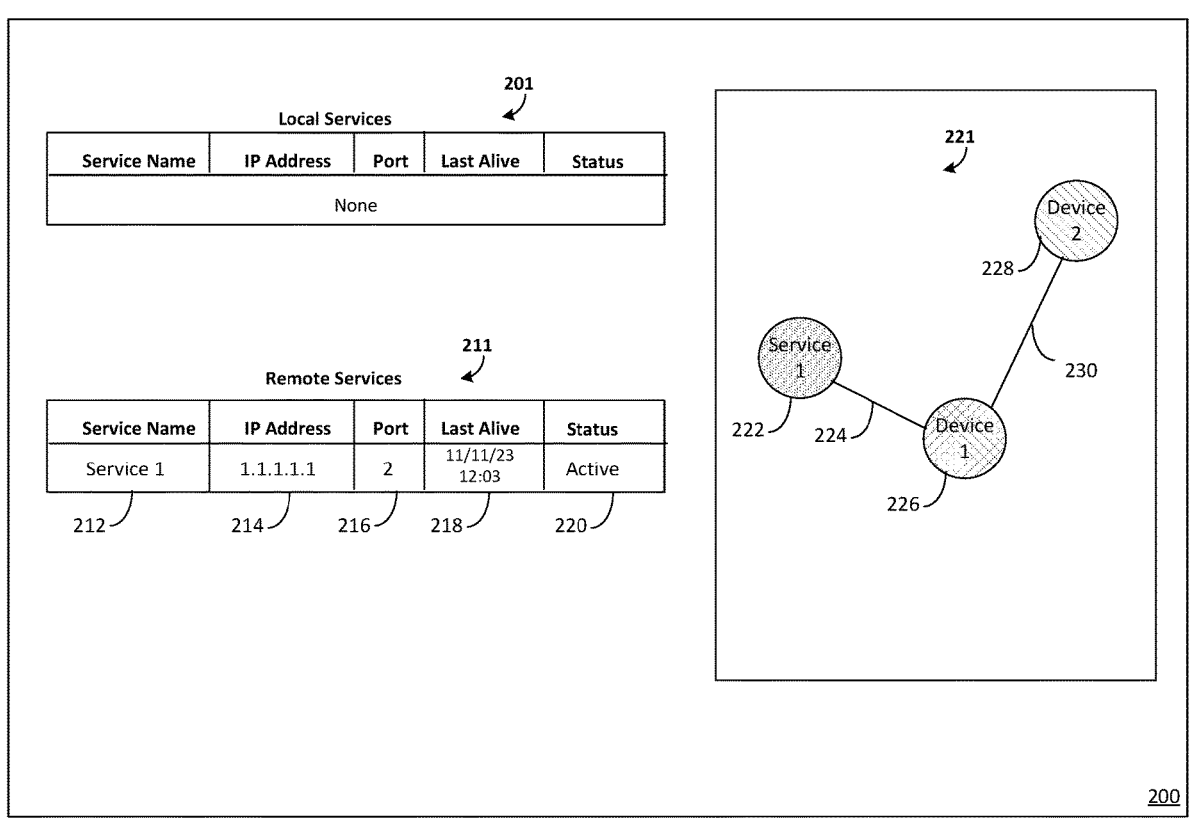
FIG. 2B is an example of a user interface for automatic service discovery and inter-service communications in a peer-to-peer network in accordance with some examples.

FIGS. 2A-2B depict an example of a user interface 200 for automatic service discovery and inter-service communications in a peer-to-peer network. User interface 200 may be provided by a services interface of a device connected to a network (e.g., a first services interface 108a of a first device 102 connected to a network 100, or a second services interface 108b of a second device 112 connected to the network 100) to enable a user of the device to view active services of devices that are connected to the network (including the device that is displaying the user interface 200). In some examples, the services interface populates and/or updates the user interface 200 with information that is stored in a registry of the device (e.g., registry 114 or registry 118) and received, by the services interface, from an SRS of the device (e.g., first SRS 104a or second SRS 104b). In some examples, user interface 200 is displayed on a display (e.g., a display screen) that is included in or coupled with the device, such as in response to the device detecting a user selection of an affordance associated with (e.g., representing) the services interface and/or with the user interface 200.

In the example of FIG. 2A, the user interface 200 is displayed by a first device (e.g., first device 102) and therefore presents a view of the network from the perspective of the first device. User interface 200 includes a first set of information 201 about local services (e.g., services that are currently or were recently active on the first device). The first set of information 201 about the local services includes a first local service name 202 (e.g., a name of a first service that is installed on the first device), a first IP address 204 (e.g., an IP address associated with the first local service), a first port 206 (e.g., a port associated with the first local service), a first last-alive time 208 (e.g., a timestamp of a most recent time at which the first local service was determined, by the first device, to be active), and a first status 210 (e.g., a status of the first local service, which may be determined as active or inactive by the first device based on the first last-alive time 208). In examples, if additional services were active and/or installed on the first device, similar information about such services would be included in the first set of information 201.

User interface 200 includes a second set of information 211 about remote services (e.g., services that are currently or were recently active on other devices in the network). In the example of FIG. 2A, there are no services active on other devices in the network, and thus the second set of information 211 is empty.

User interface 200 also includes a network graph 221 of current devices and services on the network. The network graph 221 includes a first graphical element 222 representing the first service (which is active on the first device), a second graphical element 226 representing the first device, and a third graphical element 228 representing a second device that is on the network (but has no active services). The graphical elements are connected to each other using connector lines 224, 230 to indicate connectivity paths of the represented devices and services.

In some examples, the user interface 200 displays graphical elements that represent services with different visual characteristics than graphical elements that represent devices (e.g., different colors, sizes, patterns, brightness, and/or other visual characteristics) to enable the user to easily distinguish devices from services in the network graph 221. In some examples, the first device displays graphical elements representing remote devices with different visual characteristics than the graphical element representing the local device (e.g., the first device, which is the device that causes the user interface 200 to be displayed) to enable a user to easily distinguish their own device from remote device(s) in the network graph 221. In some examples, the first device (e.g., a services interface of the first device) automatically updates the user interface 200 to add or remove display of information about local and remote services (e.g., in the first set of information 201 and the second set of information 211) and graphical elements representing devices and/or services (e.g., in the network graph 221) based on detected changes in the network (e.g., devices connecting to or dropping off the network, services becoming active or inactive). In some examples, in response to detecting that a displayed service (e.g., a service for which information about the service and/or a graphical element are displayed) has become inactive (e.g., a threshold duration has elapsed since the last-alive time of the service), the first device visually indicates that the service has become inactive, such as by changing a color, transparency, brightness, or other visual characteristic of the graphical element or the textual information about the service, such as by greying out the device or service. In some examples, in response to detecting that a displayed service has been inactive for a threshold time duration, the first device ceases to display information about the service in the user interface 200.

FIG. 2B depicts user interface 200 as displayed by the second device rather than by the first device (e.g., while the first device and second device are connected to the network, and the first service is active on the first device), and therefore presents a view of the network from the perspective of the second device. In this case, the first set of information 201 is empty (because the second device has no active local services) and the second set of information 211 about remote services includes information about the first service (e.g., the same information as displayed in the first set of information 201 in FIG. 2A). That is, the second set of information 211 includes a first remote service name 212 (e.g., the name of a first remote service), a second IP address 214 (e.g., an IP address associated with the first remote service), a second port 216 (e.g., a port associated with the first remote service), a second last-alive time 218 (e.g., a timestamp of a most recent time at which the first remote service was determined to be active), and a second status 220 (e.g., a status of the first remote service, which may be determined as active or inactive by the first device and/or second device based on the second last-alive time 218). In examples, if additional remote services were active and/or installed on a remote device (e.g., either the first device or a different device), information about such services would be included in the second set of information 211.

As previously discussed, user interface 200 also includes a network graph 221 of current devices and services on the network. In FIG. 2B, however, the visual characteristics of the third graphical element 228 (representing the second device) and the second graphical element 226 (representing the first device) are swapped relative to FIG. 2A because the user interface 200 is displayed on the second device rather than on the first device (e.g., the second device is now the local device, and the first device is now the remote device).

FIG. 3A depicts an example of a user interface 300 for automatic service discovery and inter-service communications in a peer-to-peer network. User interface 300 may be provided by a services interface of a device connected to a network (e.g., a first services interface 108a of a first device 102 connected to a network 100, or a second services interface 108b of a second device 112 connected to the network 100) to enable a user of the device to view active services of devices that are connected to the network and request queries to such services by entering a search string. In some examples, the services interface populates and/or updates the user interface 300 with information that is stored in a registry of the device (e.g., registry 114 or registry 118) and received, by the services interface, from an SRS of the device (e.g., first SRS 104a or second SRS 104b). In some examples, user interface 300 is displayed on a display (e.g., a display screen) that is included in or coupled with the device, such as in response to the device detecting a user selection of an affordance associated with (e.g., representing) the services interface and/or the user interface 300.

User interface 300 includes information about the current network state, such as devices that are currently connected to the network, services that are active on the devices connected to the network, and (in some cases) offerings that are associated with the active services. For example, user interface 300 includes an indication of a first device 302 and an indication of a second device 308 that are each connected to the network. User interface 300 includes information about a first service 304 that is active on the first device (e.g., a service name, a service IP address, a service port, and a service status) and information about a first offering 306 associated with the first service (e.g., an offering name, an offering description, and an offering URL). User interface 300 includes information about a second service 310 that is active on the second device and information about a second offering 312 and third offering 314 associated with the second service.

User interface 300 includes a device selection region 316 configured to receive a user input indicating a selected device (e.g., a device having a service or offering to be queried). In some examples, user interface 300 provides a drop-down menu associated with the device selection region 316 that includes a list of devices that are available to be queried (e.g., devices on the network that have services that can be queried).

User interface 300 includes a service selection region 318 configured to receive a user input indicating a selected service (e.g., a service associated with a device selected via the device selection region 316). In some examples, user interface 300 provides a drop-down menu associated with the service selection region 318 that includes a list of services that are available to be queried (e.g., services that are active on the device selected via the device selection region 316).

User interface 300 includes an offerings selection region 320 configured to receive a user input indicating a selected offering (e.g., an offering associated with a service selected via the service selection region 318). In some examples, user interface 300 provides a drop-down menu associated with the offerings selection region 320 that includes a list of offerings that are available to be queried (e.g., offerings that are associated with the selected service).

User interface 300 includes a search string entry region 326 configured to receive a user input indicating a search string (e.g., a text string).

User interface 300 includes a submit affordance 322 that, when selected via a user input, causes the services interface to generate a query based on the information entered in user interface 300 (e.g., based on the selected device, service, offering, and/or search string).

User interface 300 includes a reset affordance 324 that, when selected via a user input, causes the services interface to reset the selected device, service, offering, and/or search string.

User interface 300 includes a current queries region 328 that is configured to display queries that are currently active (e.g., queries previously generated by the services interface based on user inputs and transmitted to the requested service). In the example of FIG. 3B, the services interface has not yet transmitted a query to a service, and thus the current queries region 328 is empty.

User interface 300 includes a notifications region 330 that is configured to display notifications received from services in response to queries. In the example of FIG. 3A, the services interface has not yet received any notifications, and thus the notifications region 330 is empty.

FIG. 3B depicts an example of user interface 300 when the services interface has received user inputs indicating a selected device (Device 2), a selected service of the selected device (Service 2), a selected offering of the selected service (Offering 3), and a search string ("Car"). In response to detecting a user input indicating a selection of the submit affordance, the services interface will generate and transmit (to the selected service) a query based on information about the selected service and offering, where the query includes the search string (e.g., along with other information).

FIG. 3C depicts an example of user interface 300 after the query has been transmitted to the selected service and after two notifications have been received from the selected service in response to the query. The current queries region now includes information about the query 332 submitted based on the inputs depicted in FIG. 3B and a delete affordance 334 that, when selected, causes the services interface to transmit, to the selected service, a request to delete the query (e.g., to cause service 2 and offering 3 to cease monitoring for data that satisfies the search string of "car").

The notifications region now includes a first notification 336 and a second notification 338 that have been received from Service 2 in response to the query. Each notification includes information about the query with which the notification is associated, including the search string, the selected service (e.g., the service that identified the data), and the selected offering. Each notification also includes a timestamp (e.g., a time at which the data satisfying the query was identified) and a viewing URL at which the data satisfying the query can be viewed. In some examples, the viewing URL is displayed as a link that the user can select to navigate to the viewing URL to access (e.g., view, download, edit) the corresponding data.

FIG. 4 depicts a flowchart of a method 400 for automatic service discovery and inter-service communications in a peer-to-peer network. The operations of method 400 may be performed by one or more computing devices, such as the first device 102 or second device 112 of FIG. 1A and/or the computing device 500 depicted in FIG. 5. In some examples, certain operations depicted in method 400 may be combined, rearranged, or omitted.

At operation 402, a first device (e.g., first device 102) connected to a peer-to-peer network (e.g., network 100) receives, from a second device connected to the peer-to-peer network (e.g., second device 112), information about a first service that is active on the second device (e.g., second service 116). In some examples, the information includes an Internet protocol (IP) address associated with the first service, a port associated with the first service, a service name associated with the first service, a last-alive time associated with the first service, a status associated with the first service, a namespace associated with the first service, a pod name associated with the first service, a location associated with the first service (e.g., a geographic location, a GPS location, a rack within a data center, or another type of location), a description associated with the first service, a service identifier associated with the first service, or a combination of these. In some examples, a first SRS (e.g., first SRS 104a) of the first device receives the information about the first service.

At operation 404, the first device stores the information about the first service in a registry (e.g., registry 114) of the first device. In some examples, a first SRS of the first device (e.g., first SRS 104a) stores the information about the first service in the registry. In some examples, the first SRS provides the information about the first service to a first services interface (e.g., first services interface 108a) of the first device. In some examples, in response to receiving the information about the first service from the first SRS, the first services interface requests, from the first service (e.g., based on the information about the first service, such as an IP address associated with the first service), information about available offerings associated with the first service, and receives information about available offerings from the first service. In some examples, the information about the offerings includes a description of the offering(s) and/or an offering URL(s) associated with the offering(s).

At operation 406, the first device detects, while the information about the first service is stored in the registry, a request to transmit a first query to the first service. In some examples, the request to transmit the query to the first service includes an indication of the second device, an indication of the first service, an indication of a first offering of the first service (e.g., an offering to be queried), and/or a search string. In some examples, the first device detects the request to transmit the first query by detecting one or more user inputs (e.g., user inputs provided via a user interface such as user interface 300). In some examples, the first device detects the request to transmit the first query by receiving the request from an application running on the first device.

At operation 408, in response to detecting the request, the first device transmits, to the second device based on the information about the first service (such as an IP address associated with the first service), the first query. In some examples, the first query includes a search string (e.g., a search string included in the request), a callback URL indicating an endpoint of the services interface of the first device (e.g., a destination to which the first service should send notifications in response to the query), and/or an offering URL or other information that specifies an offering endpoint of the first service (e.g., if a specific offering of the first service is being queried).

At operation 410, the first device receives, from the second device after the first device transmits the first query, a notification associated with the first query. In some examples, the services interface of the first device receives the notification from the first service. In some examples, the notification includes the name of the first service, the offering (if any), the IP address and/or port of the first service, the search string (e.g., the string that was included in the query and used, by the first service, to identify the data), a timestamp of the notification (e.g., a time at which the data was identified and/or the notification was generated), and/or a viewing URL that provides a link to view the data that satisfied the query. In some examples, in response to receiving the notification, the services interface of the first device displays the notification in a user interface (e.g., user interface 300).

Figure 5:
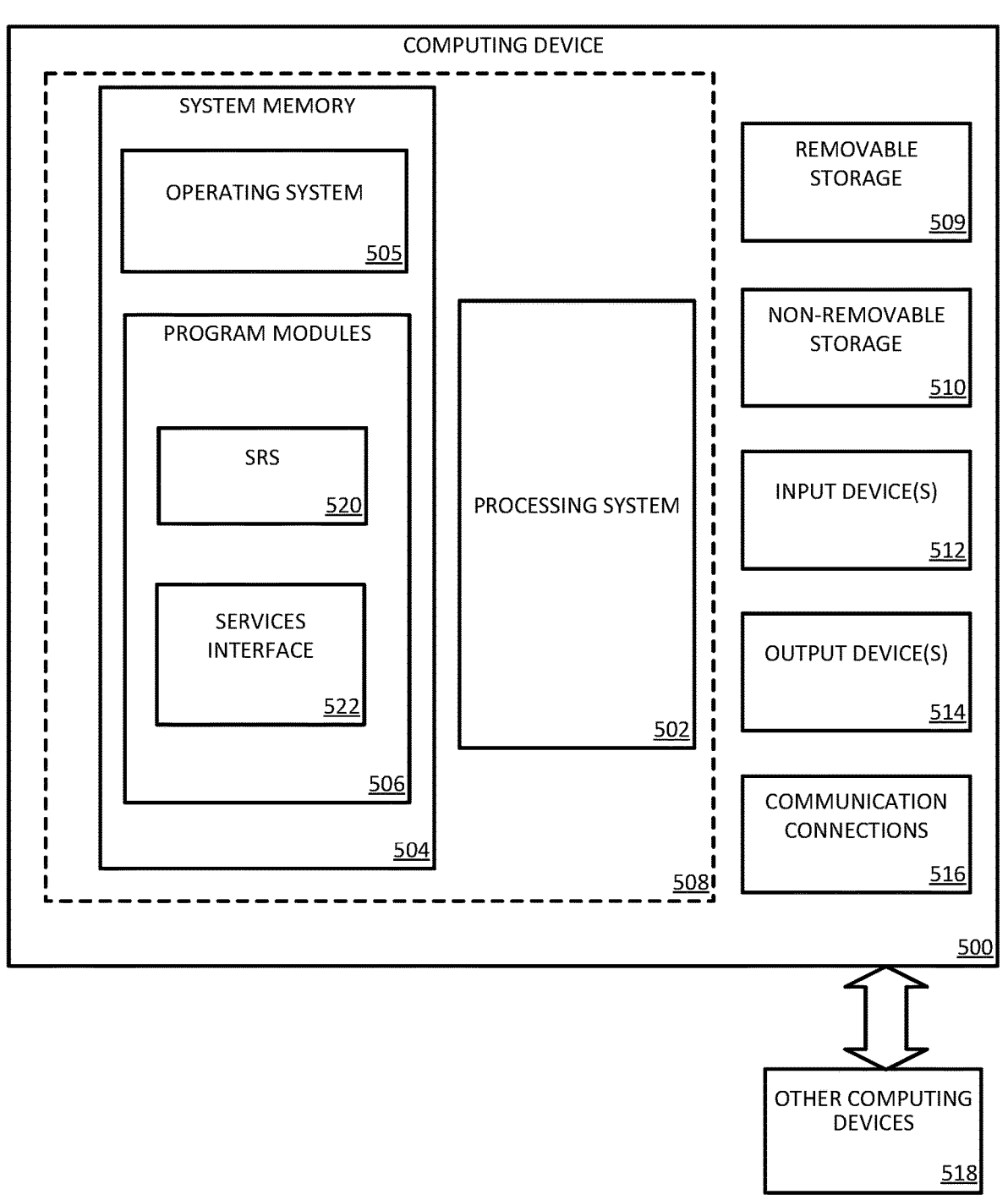
FIG. 5 is a block diagram illustrating example physical components of a computing device with which aspects of the disclosure may be practiced.

FIG. 5 and the associated description provides a discussion of a variety of operating environments in which examples of the disclosure may be practiced. However, the devices and systems illustrated and discussed with respect to FIG. 5 are for purposes of example and illustration; a vast number of computing device configurations may be utilized for practicing aspects of the disclosure described herein.

FIG. 5 is a block diagram illustrating physical components (e.g., hardware) of an example of a computing device 500 with which examples of the present disclosure may be practiced. The computing device components described below may be suitable for one or more of the components of the network 100 described above. In a basic configuration, the computing device 500 includes at least one processing unit 502 and a system memory 504. Depending on the configuration and type of computing device 500, the system memory 504 may comprise volatile storage (e.g., random access memory), non-volatile storage (e.g., read-only memory), flash memory, or any combination of such memories. In the example of FIG. 5, the system memory 504 includes an operating system 505 and one or more program modules 506 suitable for performing automatic service discovery and inter-service communications in a peer-to-peer network, such as an SRS 520 (which may be an example of first SRS 104a and/or second SRS 104b) and/or a services interface 522 (which may be an example of first services interface 108a and/or second services interface 108b).

In some examples, the SRS 520 and/or services interface 522 are applications (e.g., software) installed on the computing device 500. In some examples, the SRS 520 and/or services interface 522 are implemented using a virtual machine implementation, a pod implementation, a bare metal implementation, or any other suitable implementation.

The operating system 505 may be suitable for controlling the operation of the computing device 500. Furthermore, aspects of the disclosure may be practiced in conjunction with a graphics library, other operating systems, or any other application program and is not limited to any particular application or system. This basic configuration is illustrated in FIG. 5 by those components within a dashed line 508. The computing device 500 may have additional features or functionality. For example, the computing device 500 may also include additional data storage devices (removable and/or non-removable) such as, for example, magnetic disks, or optical disks. Such additional storage is illustrated in FIG. 5 by a removable storage device 509 and a non-removable storage device 510.

As stated above, a number of program modules and data files may be stored in the system memory 504. While executing on the processing unit 502, the program modules 506 may perform processes including one or more of the stages of the method 400 illustrated in FIG. 4. In some examples, such processes and methods may be distributed across multiple processing units 502, such that each processing unit 502 performs a portion of the processes and methods.

Furthermore, examples of the disclosure may be practiced in an electrical circuit comprising discrete electronic elements, packaged or integrated electronic chips containing logic gates, a circuit utilizing a microprocessor, or on a single chip containing electronic elements or microprocessors. For example, examples of the disclosure may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to providing spatial-textual clustering-based predictive recognition of text in a video may be operated via application-specific logic integrated with other components of the computing device 500 on the single integrated circuit (chip). Examples of the present disclosure may also be practiced using other technologies capable of performing logical operations such as, for example, AND, OR, and NOT, including mechanical, optical, fluidic, and quantum technologies.

In the example of FIG. 5, the computing device 500 also has one or more input device(s) 512 (such as a keyboard, a mouse, a pen, a sound input device, a touch input device, a camera, etc.) and output device(s) 514 (such as a display, speakers, a printer, etc.). The aforementioned devices are examples and others may be used. In the example of FIG. 5, the computing device 500 includes one or more communication connections 516 to enable communications with other computing devices 518 (e.g., via a peer-to-peer network and/or other types of communication networks). Examples of communication connections 516 include a radio frequency (RF) transmitter, receiver, and/or transceiver circuitry; universal serial bus (USB), parallel, and/or serial ports.

The term computer readable media as used herein includes volatile and nonvolatile, removable and non-removable media implemented in any method or technology for storage of information, such as computer readable instructions, data structures, or program modules. The system memory 504, the removable storage device 509, and the non-removable storage device 510 are all computer readable media examples (e.g., memory storage.) Computer readable media include random access memory (RAM), read-only memory (ROM), electrically erasable programmable ROM (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. Any such computer readable media may be part of the computing device 500. In some examples, computer readable media includes non-transitory computer readable media and does not include a carrier wave or other propagated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, communication media may include wired media such as a wired network or direct-wired connection, and wireless media such as acoustic, RF, infrared, and other wireless media.

Examples include a computer-implemented method, including: receiving, at first device connected to a peer-to-peer network from a second device connected to the peer-to-peer network, information about a first service that is active on the second device; storing the information about the first service in a registry of the first device; detecting, by the first device while the information about the first service is stored in the registry, a request to transmit a first query to the first service; in response to detecting the request, transmitting, by the first device to the second device based on the information about the first service, the first query; and receiving, by the first device from the second device after transmitting the first query, a first notification associated with the first query.

In some examples, the first notification includes a first uniform resource locator (URL) at which first data associated with the first query can be accessed.

In some examples, the method includes detecting, by the first device, that a second service has become active on the first device; and in response to detecting that the second service has become active, multicasting, by the first device to the peer-to-peer network, information about the second service, where the information about the second service includes at least one of an Internet protocol (IP) address associated with the second service, a port associated with the second service, a service name associated with the second service, a last-alive time associated with the second service, a status associated with the second service, a namespace associated with the second service, a pod name associated with the second service, a location associated with the second service, a description associated with the second service, or a service identifier associated with the second service.

In some examples, the method includes, after multicasting the information about the second service and while the second service remains active on the first device, periodically multicasting, by the first device to the peer-to-peer network, an indication that the second service is active.

In some examples, the method includes, after multicasting at least a first indication that the second service is active, detecting that the second service has become inactive on the first device; and in response to detecting that the second service has become inactive, ceasing to periodically multicast the indication that the second service is active.

In some examples, the method includes receiving, by the first device from the second device while the second service is active on the first device, a second query associated with the second service; identifying, by the second service based on the second query, second data that satisfies the second query; and in response to identifying the second data, transmitting, by the first device to the second device, a second notification associated with the second query.

In some examples, the method includes, in response to identifying the second data, storing the second data at a second URL, where the second notification includes the second URL.

In some examples, the method includes presenting the first notification via a display of the first device.

In some examples, the method includes determining, by the first device, that a threshold duration has elapsed since receiving the information about the first service; and in response to determining that the threshold duration has elapsed, removing the information about the first service from the registry.

In some examples, the information about the first service includes at least one of an Internet protocol (IP) address associated with the first service, a port associated with the first service, a service name associated with the first service, a last-alive time associated with the first service, a status associated with the first service, a namespace associated with the first service, a pod name associated with the first service, a location associated with the first service, or a description associated with the first service, a service identifier associated with the first service.

In some examples, detecting the request to transmit the first query includes detecting a user input in a user interface displayed by the first device, the user input including a search string, and the first query includes the search string.

In some examples, the method includes, in response to receiving the information about a first service, transmitting, by the first device to the second device, a request for information about available offerings associated with the first service; and receiving, from the second device, an indication of a first offering associated with the first service, where detecting the request to transmit the first query includes detecting a selection of the first offering, and the first query includes an indication of the first offering.

In some examples, a first computing device is connected to a peer-to-peer network, the first computing device including one or more processing units; and memory storing instructions that, when executed by the one or more processing units, cause the first computing device to: receive, from a second computing device connected to the peer-to-peer network, information about a first service that is active on the second computing device; store the information about the first service in a registry of the first computing device; detect, while the information about the first service is stored in the registry, a request to transmit a first query to the first service; in response to detecting the request, transmit, to the second computing device based on the information about the first service, the first query; and receive, from the second computing device after transmitting the first query, a first notification associated with the first query.

In some examples, the first query includes a search string and the first notification includes the search string.

In some examples, the instructions further cause the first computing device to: in response to receiving the information about the first service, transmit, to the second computing device, a request for information about available offerings associated with the first service; receive, from the second computing device, the information about the available offerings associated with the first service; and display, via a display of the first computing device, the information about the first service and the available offerings.

In some examples, the instructions further cause the first computing device to: detect, that a second service has become active on the first computing device; and in response to detecting that the second service has become active, store, in the registry, information about the second service including at least one of an Internet protocol (IP) address associated with the second service, a port associated with the second service, a service name associated with the second service, a namespace associated with the second service, a pod name associated with the second service, a location associated with the second service, or a description associated with the second service.

In some examples, the instructions further cause the first computing device to: detect that the second service has become inactive on the first computing device; and in response to detecting that the second service has become inactive, remove the information about the second service from the registry.

In some examples, the instructions further cause the first computing device to: receive, from a third computing device connected to the peer-to-peer network while the second service is active on the first computing device, a second query associated with the second service; identify, by the second service based on the second query, second data that satisfies the second query; and in response to identifying the second data, transmit, to the third computing device, a second notification associated with the second query.

In some examples, the second notification associated with the second query includes a viewing uniform resource locator (URL) that provides a link to view the second data.

In some examples, a system includes a first device connected to a peer-to-peer network; and a display screen coupled with the first device, where the system is configured to: receive, from a second device via the peer-to-peer network, information about a first service that is active on the second device; in response to receiving the information about the first service, display, via the display screen, a user interface including: an indication of the second device, at least some of the information about the first service, a device selection region configured to receive a user input indicating a selected device, and a search string entry region configured to receive a user input indicating a search string; detect, via the user interface, a plurality of user inputs including a first user input indicating the second device and a second user input indicating a first search string; and in response to detecting the plurality of user inputs, transmitting, to the second device via the peer-to-peer network, a first query including the first search string.

The methods, modules, and components depicted herein are merely examples. Alternatively, or in addition, the functionality described herein can be performed, at least in part, by one or more hardware logic components. For example, illustrative types of hardware logic components that can be used include Field-Programmable Gate Arrays (FPGAs), Application-Specific Integrated Circuits (ASICs), Application-Specific Standard Products (ASSPs), System-on-a-Chip systems (SOCs), Complex Programmable Logic Devices (CPLDs), etc.

The functionality associated with some examples described in this disclosure can also include instructions stored in a non-transitory media. The term "non-transitory media" as used herein refers to any media storing data and/or instructions that cause a machine to operate in a specific manner. Illustrative non-transitory media include non-volatile media and/or volatile media. Non-volatile media include, for example, a hard disk, a solid-state drive, a magnetic disk or tape, an optical disk or tape, a flash memory, an erasable programmable read-only memory (EPROM), non-volatile random access memory (NVRAM), phase-change random-access memory (PRAM), or other such media, or networked versions of such media. Volatile media include, for example, dynamic memory such as dynamic random access memory (DRAM), static random access memory (SRAM), a cache, or other such media. Non-transitory media is distinct from, but can be used in conjunction with, transmission media. Transmission media is used for transferring data and/or instruction to or from a machine. Examples of transmission media include coaxial cables, fiber-optic cables, copper wires, and wireless media, such as radio waves.

Furthermore, boundaries between the functionality of the above-described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the disclosure provides specific examples, various modifications and changes can be made without departing from the scope of the disclosure as set forth in the claims below. Accordingly, the specification and figures are to be regarded in an illustrative rather than a restrictive sense, and all such modifications are intended to be included within the scope of the present disclosure. Any benefits, advantages, or solutions to problems that are described herein with regard to a specific example are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A computer-implemented method, comprising:
   receiving, at a first device connected to a peer-to-peer network from a second device connected to the peer-to-peer network, information about a first service that is active on the second device;

storing the information about the first service in a registry of the first device;

detecting, by the first device while the information about the first service is stored in the registry, a request to transmit a first query to the first service;

in response to detecting the request, transmitting, by the first device to the second device based on the information about the first service, the first query;

receiving, by the first device from the second device after transmitting the first query, a first notification associated with the first query;

detecting, by the first device, that a second service has become active on the first device;

in response to detecting that the second service has become active, multicasting, by the first device to the peer-to-peer network, information about the second service;

receiving, by the first device from the second device while the second service is active on the first device, a second query associated with the second service;

identifying, by the second service based on the second query, second data that satisfies the second query; and in response to identifying the second data, transmitting, by the first device to the second device, a second notification associated with the second query.

2. The method of claim 1, wherein the first notification comprises a first uniform resource locator (URL) at which first data associated with the first query can be accessed.

3. The method of claim 1, wherein the information about the second service comprises at least one of an Internet protocol (IP) address associated with the second service, a port associated with the second service, a service name associated with the second service, a last-alive time associated with the second service, a status associated with the second service, a namespace associated with the second service, a pod name associated with the second service, a location associated with the second service, a description associated with the second service, or a service identifier associated with the second service.

4. The method of claim 3, further comprising:

after multicasting the information about the second service and while the second service remains active on the first device, periodically multicasting, by the first device to the peer-to-peer network, an indication that the second service is active.

5. The method of claim 4, further comprising:

after multicasting at least a first indication that the second service is active, detecting that the second service has become inactive on the first device; and in response to detecting that the second service has become inactive, ceasing to periodically multicast the indication that the second service is active.

6. The method of claim 1, further comprising:

in response to identifying the second data, storing the second data at a second URL, wherein the second notification comprises the second URL.

7. The method of claim 1, further comprising:

presenting the first notification via a display of the first device.

8. The method of claim 1, further comprising:

determining, by the first device, that a threshold duration has elapsed since receiving the information about the first service; and in response to determining that the threshold duration has elapsed, removing the information about the first service from the registry.

9. The method of claim 1, wherein the information about the first service comprises at least one of an Internet protocol (IP) address associated with the first service, a port associated with the first service, a service name associated with the first service, a last-alive time associated with the first service, a status associated with the first service, a namespace associated with the first service, a pod name associated with the first service, a location associated with the first service, or a description associated with the first service, a service identifier associated with the first service.

10. The method of claim 1, wherein:

detecting the request to transmit the first query comprises detecting a user input in a user interface displayed by the first device, the user input comprising a search string, and the first query comprises the search string.

11. The method of claim 1, further comprising:

in response to receiving the information about a first service, transmitting, by the first device to the second device, a request for information about available offerings associated with the first service; and receiving, from the second device, an indication of a first offering associated with the first service, wherein detecting the request to transmit the first query comprises detecting a selection of the first offering, and the first query comprises an indication of the first offering.

12. A first computing device connected to a peer-to-peer network, the first computing device comprising:

one or more processing units; and memory storing instructions that, when executed by the one or more processing units, cause the first computing device to:

receive, from a second computing device connected to the peer-to-peer network, information about a first service that is active on the second computing device;

store the information about the first service in a registry of the first computing device;

detect, while the information about the first service is stored in the registry, a request to transmit a first query to the first service;

in response to detecting the request, transmit, to the second computing device based on the information about the first service, the first query;

receive, from the second computing device after transmitting the first query, a first notification associated with the first query;

detect, by the first device, that a second service has become active on the first device;

in response to detecting that the second service has become active, multicast, by the first device to the peer-to-peer network, information about the second service;

receive, by the first device from the second device while the second service is active on the first device, a second query associated with the second service;

identify, by the second service based on the second query, second data that satisfies the second query; and in response to identifying the second data, transmit, by the first device to the second device, a second notification associated with the second query.

13. The first computing device of claim 12, wherein the first query comprises a search string and the first notification comprises the search string.

14. The first computing device of claim 12, wherein the instructions further cause the first computing device to:

in response to receiving the information about the first service, transmit, to the second computing device, a request for information about available offerings associated with the first service;

receive, from the second computing device, the information about the available offerings associated with the first service; and display, via a display of the first computing device, the information about the first service and the available offerings.

15. The first computing device of claim 12, wherein the instructions further cause the first computing device to:

in response to detecting that the second service has become active, store, in the registry, information about the second service comprising at least one of an Internet protocol (IP) address associated with the second service, a port associated with the second service, a service name associated with the second service, a namespace associated with the second service, a pod name associated with the second service, a location associated with the second service, or a description associated with the second service.

16. The first computing device of claim 15, wherein the instructions further cause the first computing device to:

detect that the second service has become inactive on the first computing device; and in response to detecting that the second service has become inactive, remove the information about the second service from the registry.

17. The first computing device of claim 15, wherein the instructions further cause the first computing device to:

receive, from a third computing device connected to the peer-to-peer network while the second service is active on the first computing device, a second query associated with the second service;

identify, by the second service based on the second query, second data that satisfies the second query; and in response to identifying the second data, transmit, to the third computing device, a second notification associated with the second query.

18. The first computing device of claim 17, wherein the second notification associated with the second query comprises a viewing uniform resource locator (URL) that provides a link to view the second data.

19. A system, comprising:

a first device connected to a peer-to-peer network; and a display screen coupled with the first device, wherein the system is configured to:

receive, from a second device via the peer-to-peer network, information about a first service that is active on the second device;

in response to receiving the information about the first service, display, via the display screen, a user interface comprising:

an indication of the second device, at least some of the information about the first service, a device selection region configured to receive a user input indicating a selected device, and a search string entry region configured to receive a user input indicating a search string;

detect, via the user interface, a plurality of user inputs comprising a first user input indicating the second device and a second user input indicating a first search string; and in response to detecting the plurality of user inputs, transmitting, to the second device via the peer-to-peer network, a first query comprising the first search string.

20. The system of claim 19, wherein the information about the first service comprises at least one of an Internet protocol (IP) address associated with the first service, a port associated with the first service, a service name associated with the first service, a last-alive time associated with the first service, a status associated with the first service, a namespace associated with the first service, a pod name associated with the first service, a location associated with the first service, or a description associated with the first service, a service identifier associated with the first service.

\* \* \* \* \*